United States Patent [19]

Takeda et al.

[11] 4,094,725
[45] June 13, 1978

[54] APPARATUS FOR HOT GAS WELDING OF A PAIR OF THERMOPLASTIC MATERIALS

[75] Inventors: Shinji Takeda, Toyota; Noriyoshi Mitsui, Okazaki; Nobuharu Kato, Nagoya, all of Japan

[73] Assignee: Aisin Seiki Kabushiki Kaisha, Japan

[21] Appl. No.: 761,906

[22] Filed: Jan. 24, 1977

[30] Foreign Application Priority Data

Jan. 23, 1976  Japan .................................. 51/6981

[51] Int. Cl.² .......................................... B32B 31/00
[52] U.S. Cl. .................................. 156/497; 156/499; 239/590.3
[58] Field of Search ................. 156/82, 322, 228, 356, 156/304, 497, 306, 499, 285; 264/288; 219/243; 93/DIG. 1; 425/508; 239/590.3

[56] References Cited

U.S. PATENT DOCUMENTS

| | | | |
|---|---|---|---|
| 2,367,725 | 1/1945 | Lindh et al. ......................... | 156/306 |
| 3,075,868 | 1/1963 | Long ..................................... | 156/82 |
| 3,359,151 | 12/1967 | Hall ..................................... | 156/497 |
| 3,404,051 | 10/1968 | Hall ..................................... | 156/82 |
| 3,488,244 | 1/1970 | Lepisto ................................ | 156/497 |
| 3,941,314 | 3/1976 | Moss et al. ........................ | 239/590.3 |
| 3,953,272 | 4/1976 | Webber ............................... | 156/497 |

*Primary Examiner*—William A. Powell
*Assistant Examiner*—J. J. Gallagher
*Attorney, Agent, or Firm*—Oblon, Fisher, Spivak, McClelland & Maier

[57] ABSTRACT

A process for welding a pair of thermoplastic workpieces by hot gas ejecting, which includes the steps of (a) positioning a pair of works to be welded in opposed relation with each other, (b) positioning heat blast nozzles between the works, (c) ejecting heat blast from the nozzles to the opposed surfaces of the works, (d) retracting the nozzles from the position between the works (e) advancing one of the works to be in pressure contact with the other, and (f) pressurizing the two works for firmly combining the two.

7 Claims, 8 Drawing Figures

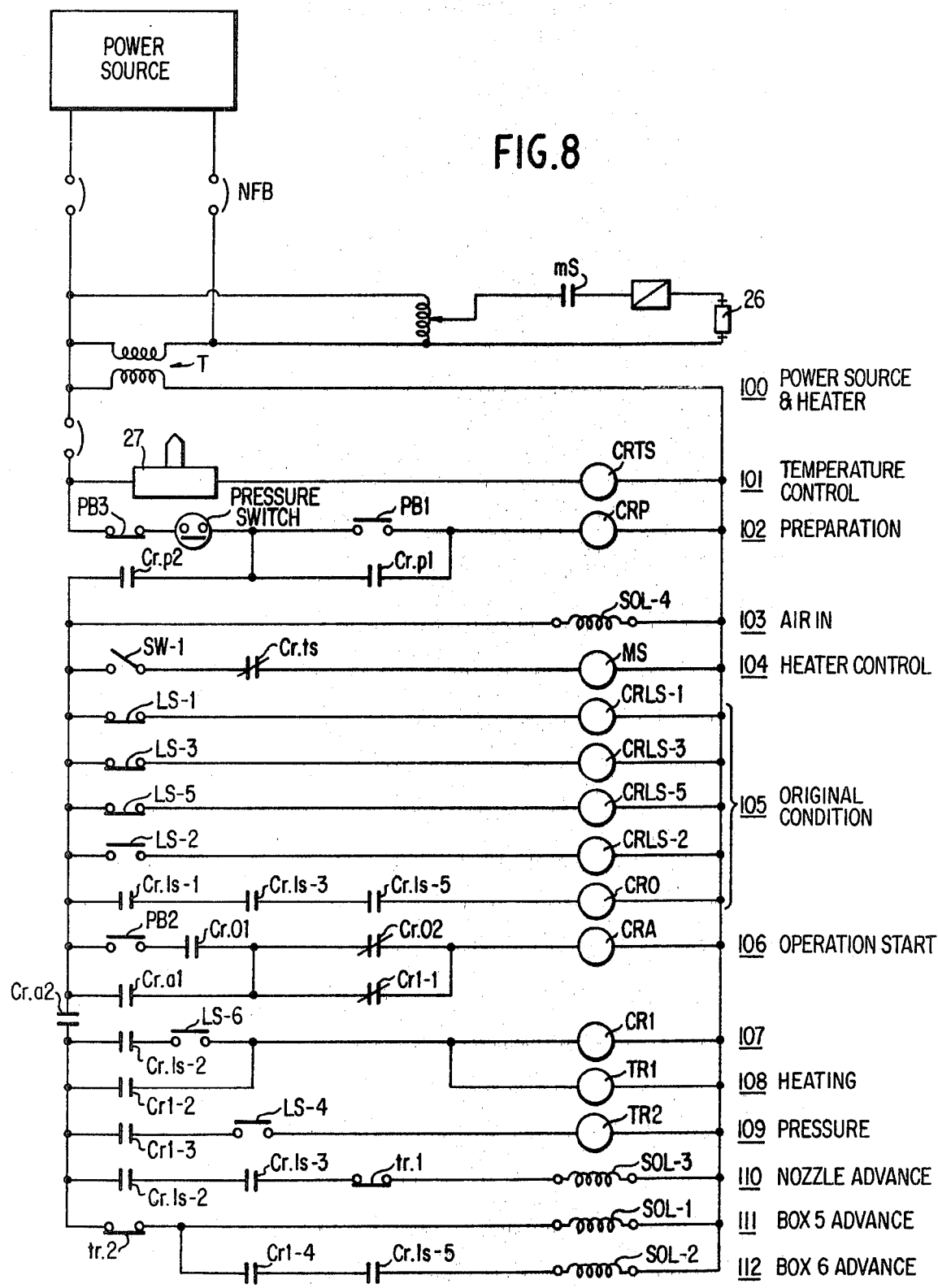

APPARATUS FOR HOT GAS WELDING OF A PAIR OF THERMOPLASTIC MATERIALS

BACKGROUND OF THE INVENTION

1. Field of the Invention

This invention relates generally to heat welding of thermoplastics and more particularly to hot gas welding of two or more thermoplastic components.

2. Description of the Prior Art

In a conventional method of hot gas welding, a welding gun is held in one hand and a filler rod, made of the same material as the parts to be welded, is held in the other hand.

With the method of such hand welding, a high degree of operator's skill and judgment are required. In addition, the hand welding of the above type must be carried out in a continuous manner from one end to the other end of the weld, with the parts clamped and positioned in each fixture. The hot gas stream must be directed in a fanning motion back and forth between the two sides of the joint as well as onto the approaching filler rod. Since the strength of the weld is greatly affected by the uniformity of pressure exerted by the rod into the joint, experience and care are required for a successful welding.

Such hand welding cannot be applied in the automobile industry which adopts a mass production system.

In another method of heat welding, a very popular contact heat weld has been used in a high-speed automatic process. In this method, a heat plate is disposed between the parts to be welded and the two parts are pressurized against the heat plate for a short period of time. Then the fixtures or clamps are retracted and the heat plate is also withdrawn, and finally the parts are pressed together under a controlled pressure to join the two parts.

This method, however, has a significant problem as to the prevention of sticking of the melted parts to the heat plate.

SUMMARY OF THE INVENTION

It is, therefore, an object of the present invention to provide an automatic hot gas welding of thermoplastics.

It is another object of the present invention to provide an automatic hot gas welding apparatus which is effective in a mass production system.

BRIEF DESCRIPTION OF THE DRAWINGS

Various other objects, features and attendant advantages of the present invention will be more fully appreciated as the same becomes better understood from the following detailed description when considered in conjunction with the accompanying drawings, in which like reference characters designate like or corresponding parts throughout the several views, and wherein:

FIG. 8 is an electric circuit showing a control of the working parts of the present invention.

DETAILED DESCRIPTION OF THE PREFERRED EMBODIMENT

Figure 1:
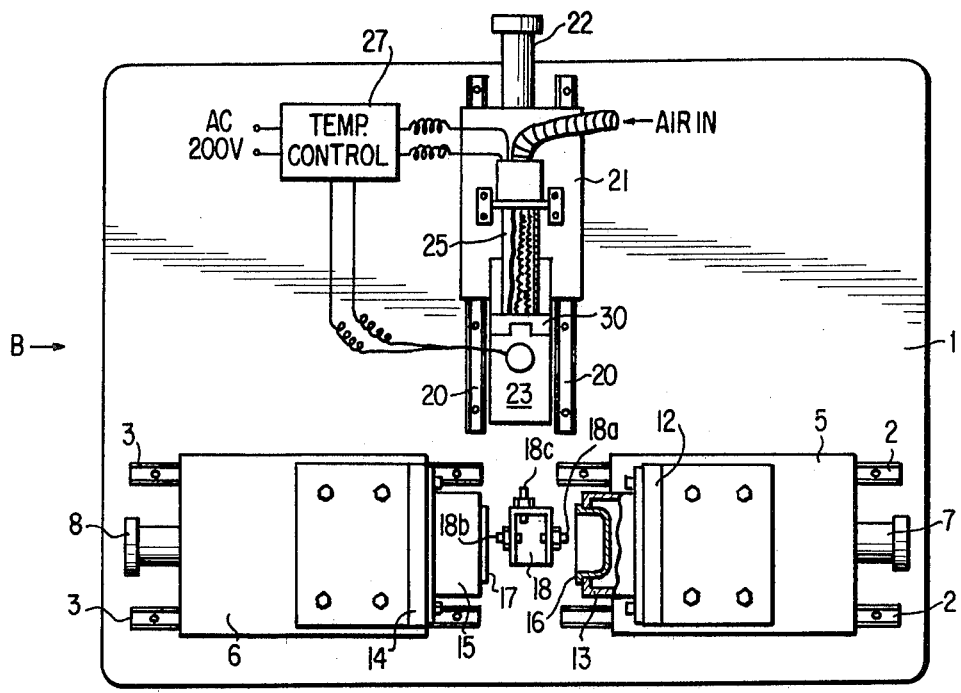
FIG. 1 is a top plan view of the welding apparatus according to the present invention.

Referring now to the drawings, and more particularly to FIGS. 1-5, member 1 designates a fixed base member of a hot gas welding apparatus of the present invention. Member 1 is made of a metal having a sufficient strength for carrying thereon various members of the apparatus later described in detail.

A pair of parallely arranged guide rails 2 are secured to the upper surface of base member 1 for slidably supporting a slidable box 5. Similarly, a further pair of parallely arranged guide rails 3 are secured to the upper surface of base member 1 for slidably supporting a further slidable box 6. The inner ends of guide rails 3 are opposed to the inner ends of guide rails 2. A plurality of roller bearings are disposed between guide rails 2, 3 and slidable boxes 5, 6 for enhancing the slidable movements of boxes 5, 6. Air cylinder means 7, 8 are disposed in the slidable boxes 5, 6, respectively. The construction of the two air cylinder means is completely the same, and therefore, only the structure of air cylinder means 7 will be explained hereinafter.

Figure 2:
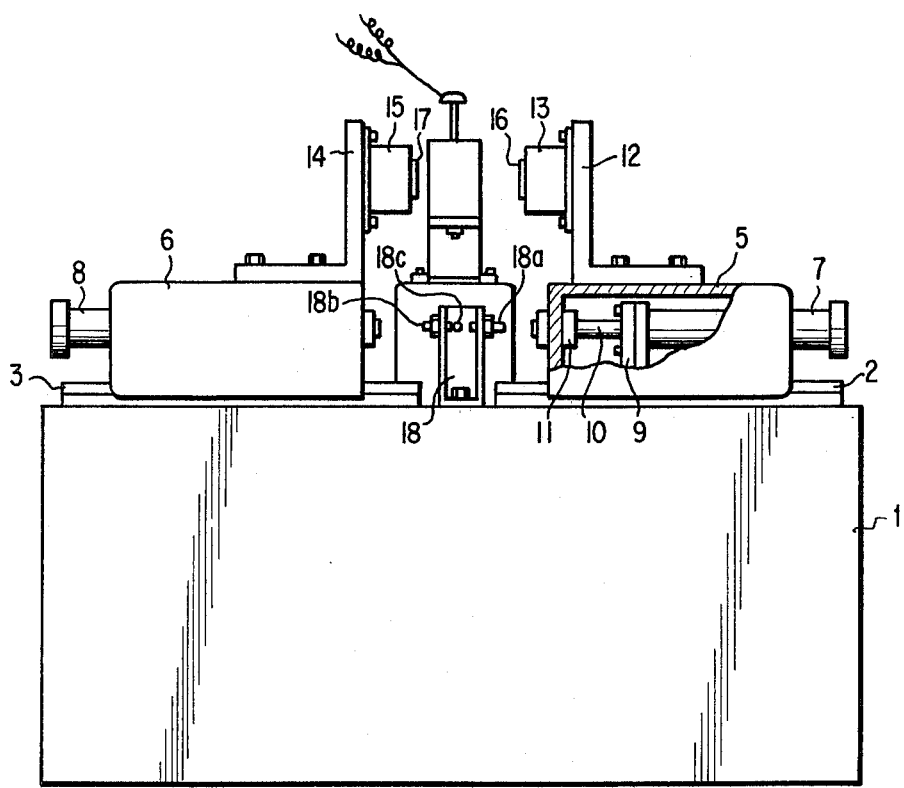
FIG. 2 is a front view seen from the arrow A of FIG. 1.
Figure 3:
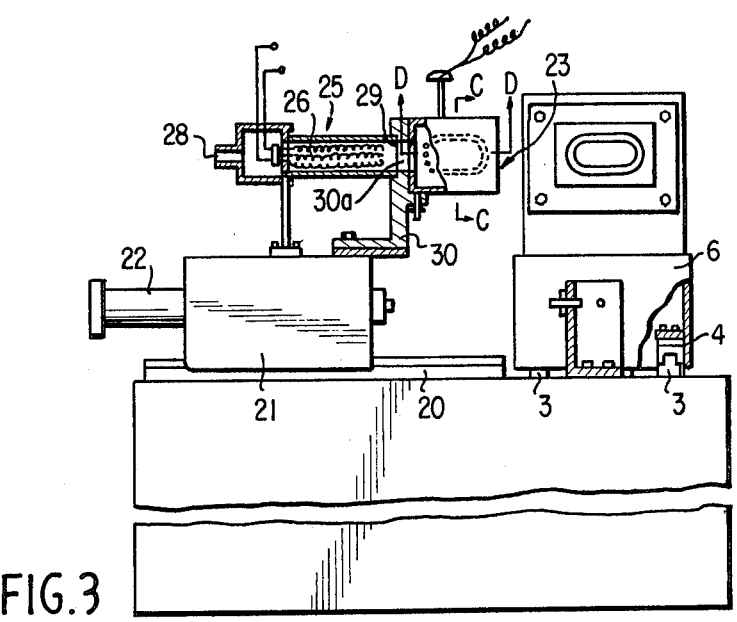
FIG. 3 is a side view seen from the arrow B of FIG. 1.

In FIG. 2, air cylinder means 7 is secured to a flanged portion 9 of base member 1 and includes a piston member 10 slidably disposed in the cylinder housing. Piston member 10 is its one end secured to the front end of box 5 by means of screws 11 for unitary movement with box 5. The piston member 10 is reciprocable in response to the air introduced into the cylinder means 7.

An upright arm 12 is secured to the upper surface of box 5 and a fixture 13 is secured to the inner surface of arm 12. Similarly, an upright arm 14 is secured to the upper surface of box 6 and a fixture 15 is secured to the inner surface of arm 14. The height of fixture 15 is the same as that of fixture 13 and therefore, fixtures 13, 15 are inwardly faced to each other. Fixtures 13, 15 are provided with recesses therein for receiving works 16, 17 to be welded, respectively. The works 16 and 17 to be welded are made of thermal plastic materials such as nylon.

A stopper means 18 is provided on base member 1 between guide rails 2 and 3, and includes stopper pins 18a, 18b for limiting the forward movements of slidable boxes 5, 6, respectively. The stopper pins 18a, 18b are so arranged that the front ends of boxes 5, 6 may be in contact with them to limit further movement of the boxes.

Works 16, 17 in fixtures 13, 15 are in a pressure contact with each other when boxes 5, 6 are moved to the innermost positions where they are forced to be stopped by stopper pins 18a, 18b of stopper means 18. Stopper pins 18a, 18b are provided with adjusting screws (not shown) for fine adjustment of the operating positions of boxes 5, 6.

Another pair of guide rails 20 are provided on the upper surface of base member 1 at right angles to the aforementioned guide rails 2, 3 for slidably supporting a further slidable box 21 thereon. Slidable box 21 is reciprocable along with rails 20 in response to the actuation of a further air cylinder means 22 secured to base member 1, similar to aforementioned cylinder means 7, 8.

Figure 4:
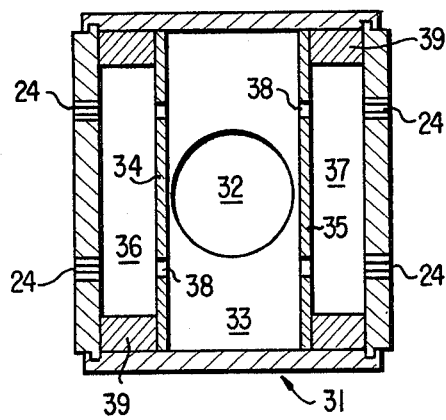
FIG. 4 is an enlarged sectional view taken on line C—C of FIG. 3.
Figure 5:
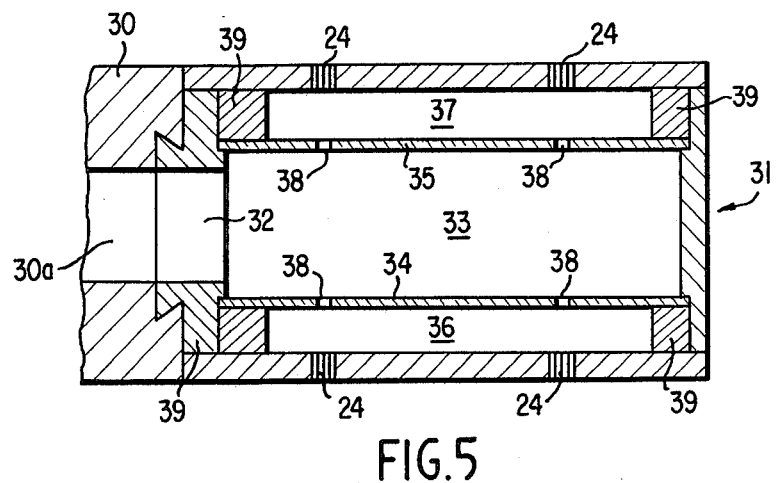
FIG. 5 is an enlarged sectional view taken on line D—D of FIG. 3.

A nozzle means 23 is provided on slidable box 21 and includes a plurality of nozzles 24 (as shown in FIGS. 4 and 5) for supplying heat blast with the works 16, 17. The inward movement of slidable box 21 is limited by a further stopper pin 18c provided on stopper means 18. A hot gas generator 25 is attached to slidable box 21 adjacent to nozzle means 23, and includes a solenoid coil 26 connected through a temperature control device 27, an air inlet 28 for introducing the air therefrom and an outlet 29 in communication with an inlet 32 of the nozzle means 23.

Nozzle means 23 is secured to slidable box 21 by means of an upright arm 30, having a throughhole 30a therein. The outlet 29 of hot gas generator 25 is in communication with inlet 32 of nozzle means 23 through hole 30a of arm 30.

Referring now to the detail of nozzle means 23 in accordance with FIGS. 4 and 5, the nozzle means 23 includes a housing 31 substantially of rectangular prism shape. Inlet 32 is concentrically provided with hole 30a of the arm 30 for introducing the air heated by hot gas generator 25. The housing 31 has a central bore 33 in communication with inlet 32, and a pair of partition walls 34, 35 parallely arranged within central bore 33 in the longitudinal direction of housing 31 defining a pair of outer chambers 36, 37 between partition walls 34, 35 and the longitudinal side walls of housing 31. Each partition wall 34, 35 has a plurality of bores 38 for communicating central bore 33 with outer chambers 36, 37. Nozzles 24 are provided at the longitudinal side walls of housing 31.

Thus, the heat blast is ejected from nozzles 24 via inlet 32, central bore 33, bores 38, and chambers 36, 37 upon operation of the apparatus. Guide means 39 are provided within outer chambers 36, 37 at both ends thereof, extending close to nozzles 24 and bores 38 for enhancing the concentration of the heat blast.

In FIG. 8, the heater 26 is connected to a power source (200 volts) through a normal open contact ms of a magnetic switch means MS. The voltage of the power source is reduced to 100 volts A.C. by means of transformer T (circuit part 100). The temperature control device 27 is connected to the circuit part 100 and is actuated to control the heater temperature by controlling the energization of relay coil CR.Ts (circuit parts 102 and 104).

Figure 7:
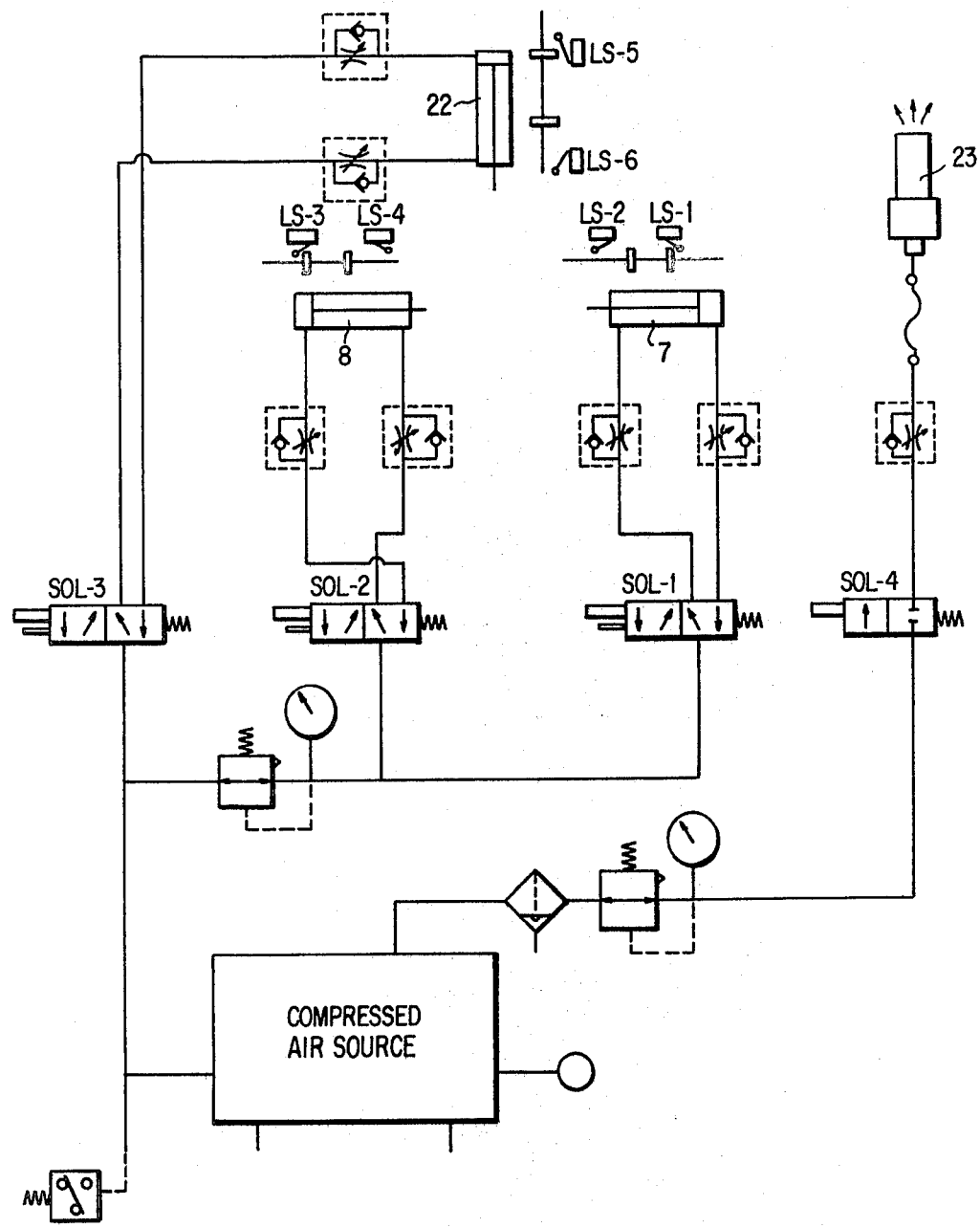
FIG. 7 is a layout scheme of the apparatus of the present invention.

In FIG. 7 there is shown a schematically illustrated apparatus of the present invention. Each air cylinder 7, 8 and 22 is connected to the compressed air source through solenoid valve means each having respective solenoid coil SOL-1, SOL-2 and SOL-3. Nozzle means 23 is also connected to the compressed air source through solenoid valve means having a solenoid coil SOL-4. The air cylinders 7, 8 and 22 are actuated to move the corresponding slidable boxes 5, 6 and 21 upon energization of the solenoid coils, respectively, while nozzle means 23 is actuated to eject air upon energization of solenoid coil SOL-4.

The air cylinder 7 includes a pair of limit switches LS-1, LS-2 and limit switch LS-1 is normally closed while the limit switch LS-2 is normally open. When air cylinder 7 is actuated to move slidable box 5 thereon r.pof solenoid coil SOL-1, switch LS-1 is open and switch LS-2 is closed. Similarly, air cylinders 8, 22 include a pair of limit switches LS-3, LS-4 and LS-5, LS-6, respectively. The operation of these switches is the same with respect to switches LS-1 and LS-2 (later explained in detail according to FIG. 8).

Preliminary Operation

Referring now back to FIG. 8, when a manual push button PB1 is actuated relay coil CR.P is energized so that normal open contacts Cr.p1 and Cr.p2 are thereby closed for self-maintaining circuit 102. Then due to the energization of the relay coil CR.P, solenoid coil SOL-4 is energized through contacts Cr.p1, Cr.p2 which have been closed. Thus, the compressed air from the source (FIG. 7) is introduced into nozzle means 23 and ejected air therefrom (circuit part 103). However, thus introduced air is not heated so long as a heater switch SW-1 is not actuated. This is because magnetic switch means MS is not actuated to close the previously described normal open contact ms of circuit part 100.

Heater Controlling

Under such conditions when heater switch SW-1 is actuated, magnetic switch means MS is energized to close the contact ms thereof. Thus heater 26 is heated to raise the temperature of the air therein to about 300° C which is defined by temperature control device 27. If the temperature of the air exceeds over the selected degree (300° C), then the temperature control device senses such temperature and actuates to energize relay coil CR.TS to open the normal close contact Cr.ts. Thus the magnetic switch means MS is de-energized to again open the contact ms.

Figure 6:
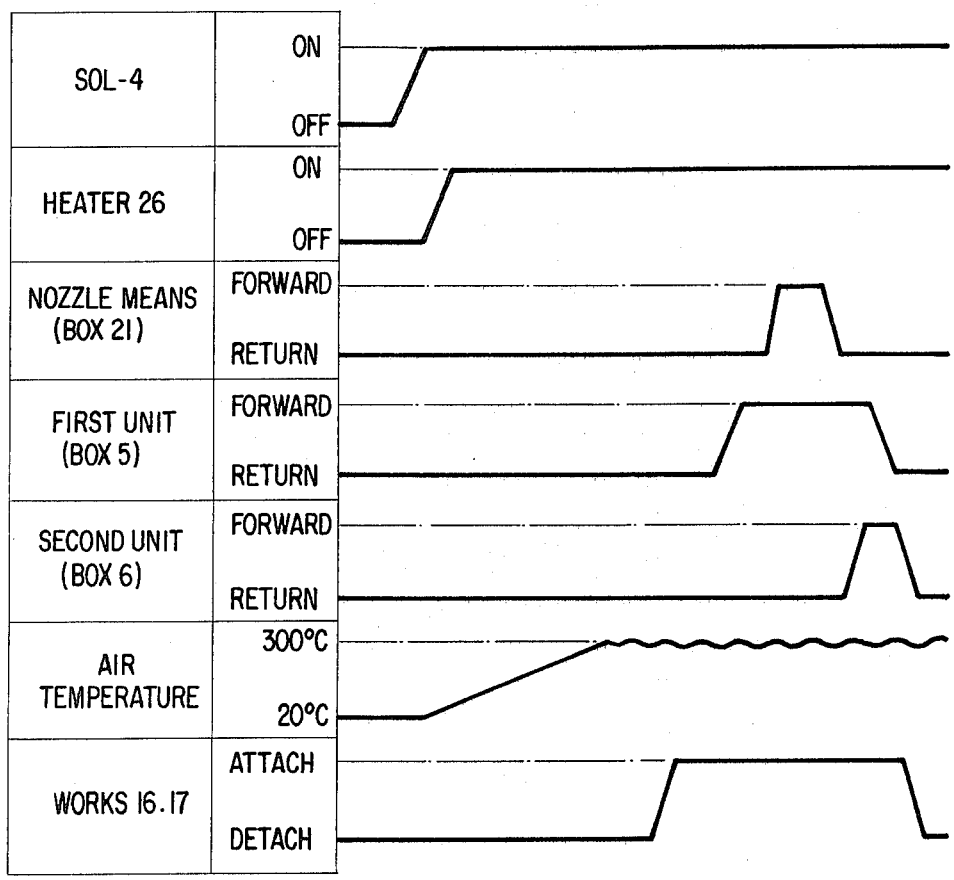
FIG. 6 is an operational diagram carried out by several main parts of the apparatus.

When the temperature of the air is below the selected degree, device 27 again de-energizes relay coil CR.TS to close contact Cr.ts. This operational repetition maintains the air temperature to about 300° C as is shown in FIG. 6.

Original Conditions: (circuit part 105)

As previously described, since limit switches LS-1, LS-3, LS-5 are normally closed (also shown in FIG. 8), the corresponding relay coils CR LS1, CR LS3, CR LS5 are energized to close the respective contacts Cr.1s1, Cr.1s3 and Cr.1s5. Therefore, relay coil CR.O is also energized to close the normal open contact Cr.01 and open the normal close contact Cr.02.

Works Attachment

Works 16, 17 are then attached to respective fixtures 13, 15 prior to actuation of starting button PB2. If necessary, works 16, 17 are held in the recesses of fixtures 13, 15 by way of vacuum suction through a vacuum pump (not shown).

Operation Start

Under such conditions, when starting button PB2 is actuated for operation, relay coil CR.A is energized through contact Cr.01 and normal close contact Cr1-1 to close the normal open contacts Cra-1 and Cra-2. Thus, the solenoid coil SOL-1 is energized through normal close contact tr2 to move or advance the slidable box 5 by the actuation of air cylinder 7 (circuit part 111). Due to the movement of box 5, limit switch LS-1 is open and instead limit switch LS-2 is closed.

By the closure of limit switch LS-2, relay coil CR LS2 is energized to close contacts Cr 1s2-1 and Cr 1s2-2. Therefore, solenoid coil SOL-3 is energized through contacts Cr 1s2-2, Cr 1s3 and normal close contact tr 1. Slidable box 21 is then advanced by the actuation of air cylinder 22 for ejecting heat blast from the nozzles thereon to the surfaces of works 16, 17 (circuit part 110). This movement of the box 21 causes limit switch LS-5 to open and limit switch LS-6 to close thereby energizing relay coil CR1 to open the normal close contact Cr1-1 and close the normal open contacts Cr1-2, Cr1-3 and Cr1-4 (circuit part 107).

Even though contact Cr1-4 is closed, relay coil CR LS-5 has been deenergized due to the opening of limit switch LS-5 and therefore, solenid coil SOL-2 is still not energized. Also, even if the contact Cr1-1 is opened, relay coil CR.A is still energized due to the opening of the normal close contact Cr.02 since relay coil CR.O is de-energized by the closing of contact Cr 1s5.

At the same time, timer TR1 is also energized for a predetermined period which is determined by the materils to be melted. This period corresponds to the heating time (circuit part 108). After such period laps, the timer TR1 is de-energized to open normal close contact tr 1 thereby to de-energize solenoid coil SOL-3 (i.e., slidable box 21 as well as nozzle means 23 thereon is returned to its original position as shown in FIG. 7). Accordingly, limit switch LS-6 is open and instead limit switch LS-5 is closed. In spite of the opening of limit switch LS-5, relay coil CR.1 is still energized through contact Cr1-2. This causes solenoid coil SOL-2 to energize through normal close contact tr.2, contacts Cr1-4, Cr1s5. Therefore, slidable box 6 is advanced for pressurizing work 17 to other work 16 for combining the two (circuit part 112).

Due to the movement of box 6, limit switch LS-3 is open and instead limit switch LS-4 is closed. The timer TR 2 is then energized through contact Cr1-3 and switch LS-4 for a predetermined period which is also determined by the materials to be pressurized. This period corresponds to the pressurizing time. (circuit part 109) After such period laps, the normal close contact tr.2 thereof is open to de-energize solenoid coil SOL-2 for returning slidable box 6 to its original position.

Thus limit switchs LS-1, LS-3, LS-5 are closed while limit switches LS-2, LS-4 and LS-6 are open.

The relay coil CR.O is thus energized to close the contact Cr.01 and open the contact Cr.02. The relay coil CR1 is still in an energized condition and therefore the normal close contact Cr1-1 thereof is open. This causes relay coil CR.A to be de-energized. Thus circuit parts 106 through 112 are returned to their original positions as shown in FIG. 8, which is the condition for preparing the next operating cycle. The works, which have been combined into one hollow plastic material, are attached to one of the fixtures 13, 15. Therefore, the combined workpiece is removed from the fixture and another pair of works are attached to the respective fixtures for preparation of the next operation.

Obviously, many modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An apparatus for welding a pair of thermoplastic workpieces by means of hot gas blasting, which comprises:
    nozzle means including;
    a housing having a central bore and side walls; and,
    a pair of partition walls parallely arranged within said central bore in the longitudinal direction of said housing whereby a pair of chambers are formed between said partition walls and said housing side walls and wherein said partition walls include a plurality of bores which communicate said pair of chambers with said central bore and wherein said housing side walls include a plurality of nozzles from which said hot gas blast is ejectable.

2. The apparatus of claim 1, which further comprises:
    a first movable means supporting thereon a workpiece to be welded;
    a second movable means supporting thereon the other workpiece to be welded, said first and second movable means being arranged in alignment for opposing said workpieces to each other; and,
    a third movable means supporting thereon said nozzle means from which said hot gas blast is ejectable, said third movable means being movable at right angles with respect to said first and second movable means,
    whereby said workpieces are heated by hot gas blast ejected from said third movable means upon said thid movable means being moved to a position between said first and second movable means and whereby said workpieces are pressurized to be welded into one piece upon relative movement of said first and second movable means.

3. The apparatus of claim 1, wherein each of said housing side walls are provided with at least one pair of nozzles.

4. The apparatus of claim 1, which further comprises:
    stopper means for limiting the forward movement of said first and second movable means.

5. The apparatus of claim 4, wherein said stopper means also includes means for limiting inward movement of said third movable means.

6. The apparatus of claim 1, which further comprises:
    a box member upon which said nozzle means housing is mounted; and,
    means for moving said housing.

7. The apparatus of claim 6, wherein said means for moving said housing comprises at least one rail member upon which said box member is disposed and means operable to reciprocably move said box member.

* * * * *